(12) United States Patent
Pichiliani et al.

(10) Patent No.: US 11,379,253 B2
(45) Date of Patent: Jul. 5, 2022

(54) TRAINING CHATBOTS FOR REMOTE TROUBLESHOOTING

(71) Applicant: International Business Machines Corporation, Armonk, NY (US)

(72) Inventors: Mauro Carlos Pichiliani, Sao Paulo (BR); Heloisa Caroline de Souza Pereira Candello, São Paulo (BR); Marisa Affonso Vasconcelos, Sao Paulo (BR); Vagner Figueredo de Santana, São Paulo (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/106,541

(22) Filed: Nov. 30, 2020

(65) Prior Publication Data

US 2022/0171641 A1 Jun. 2, 2022

(51) Int. Cl.
*G06F 9/451* (2018.01)
*H04L 51/56* (2022.01)
(Continued)

(52) U.S. Cl.
CPC .............. *G06F 9/453* (2018.02); *G06F 40/30* (2020.01); *H04L 51/02* (2013.01); *H04L 51/36* (2013.01)

(58) Field of Classification Search
CPC ......... G06F 9/453; G06F 40/30; H04L 51/02; H04L 51/36
See application file for complete search history.

(56) References Cited

U.S. PATENT DOCUMENTS

| 6,260,160 B1 | 7/2001 | Beyda |
| 7,055,137 B2 | 5/2006 | Mathews |

(Continued)

FOREIGN PATENT DOCUMENTS

| EP | 1326415 B1 | 10/2008 |
| EP | 1120953 B1 | 3/2009 |

(Continued)

OTHER PUBLICATIONS

Chang et al., "GUI Testing Using Computer Vision", Proceedings of the 28th International Conference on Human Factors in Computing Systems, CHI 2010, Apr. 10-15, 2010, Atlanta, Georgia, USA, 10 Pages.

(Continued)

*Primary Examiner* — Seth A Silverman
(74) *Attorney, Agent, or Firm* — Stephanie L. Carusillo

(57) ABSTRACT

In an approach to training a chatbot for remote troubleshooting, one or more computer processors receive a request for help with an issue from a user via a chatbot. One or more computer processors extract information associated with the issue from the request. One or more computer processors determine a script is not available to resolve the issue. One or more computer processors request an agent to resolve the issue. One or more computer processors monitor one or more actions performed by the agent to resolve the issue. Based on the one or more actions, one or more computer processors generate a script, wherein the script includes a sequence of commands corresponding to the one or more actions. One or more computer processors store the script.

20 Claims, 4 Drawing Sheets

(51) Int. Cl.
*H04L 51/02* (2022.01)
*G06F 40/30* (2020.01)

(56) References Cited

U.S. PATENT DOCUMENTS

| | | | |
|---|---|---|---|
| 7,284,155 B2 | 10/2007 | Faihe | |
| 7,542,902 B2 | 6/2009 | Scahill | |
| 7,627,821 B2 | 12/2009 | Klementiev | |
| 7,747,702 B2 | 6/2010 | Anderson | |
| 7,873,965 B2 | 1/2011 | Hayton | |
| 7,904,074 B2 | 3/2011 | Karaoguz | |
| 7,949,677 B2 | 5/2011 | Croft | |
| 8,332,464 B2 | 12/2012 | Dispensa | |
| 8,924,461 B2 | 12/2014 | Gentile | |
| 9,304,827 B2 | 4/2016 | Werth | |
| 10,079,736 B2 | 9/2018 | Bellini, III | |
| 10,187,337 B2 | 1/2019 | Smullen | |
| 10,528,446 B2 | 1/2020 | Aloni | |
| 11,005,997 B1* | 5/2021 | Deegan | G06F 40/295 |
| 2007/0294368 A1 | 12/2007 | Bomgaars | |
| 2010/0251128 A1* | 9/2010 | Cordasco | H04L 67/125 |
| | | | 715/736 |
| 2011/0202798 A1 | 8/2011 | Vera | |
| 2012/0191629 A1* | 7/2012 | Shae | G06F 16/332 |
| | | | 706/11 |
| 2015/0296051 A1 | 10/2015 | Yip | |
| 2017/0277624 A1* | 9/2017 | Avadhanula | G06F 9/451 |
| 2018/0159979 A1 | 6/2018 | Amir | |
| 2018/0219807 A1* | 8/2018 | Thinguldstad | G06F 16/3329 |
| 2019/0268473 A1 | 8/2019 | Amir | |
| 2020/0059558 A1* | 2/2020 | Mazza | G06F 16/3329 |
| 2020/0065151 A1* | 2/2020 | Ghosh | G06F 40/30 |
| 2021/0029065 A1* | 1/2021 | Erhart | H04L 51/02 |
| 2021/0144106 A1* | 5/2021 | Chen | H04L 51/046 |
| 2021/0150155 A1* | 5/2021 | Kim | G06F 40/205 |

FOREIGN PATENT DOCUMENTS

| | | |
|---|---|---|
| EP | 2056578 B1 | 10/2012 |
| EP | 1320805 B1 | 11/2016 |
| WO | 2019008572 A1 | 1/2019 |
| WO | 2019162700 A1 | 8/2019 |
| WO | 2020027843 A1 | 2/2020 |

OTHER PUBLICATIONS

Santana et al., "Summarizing Observational Client-side Data to Reveal Web Usage Patterns", Proceedings of the 2010 ACM Symposium on Applied Computing (SAC), Sierre, Switzerland, Mar. 22-26, 2010, 30 Pages.

* cited by examiner

TRAINING CHATBOTS FOR REMOTE TROUBLESHOOTING

BACKGROUND OF THE INVENTION

The present invention relates generally to the field of digital communication, and more particularly to training a chatbot for remote troubleshooting.

A chatbot is a software application used to conduct an on-line chat communication via text or text-to-speech, in lieu of providing direct contact with a human agent. Designed to convincingly simulate the way a human behaves as a conversational partner, chatbot systems typically require continuous tuning and testing. Chatbots are used in dialog systems for various purposes including customer service, request routing, or for information gathering. While some chatbot applications use extensive word-classification processes, natural language processors, and sophisticated artificial intelligence (AI), others simply scan for general keywords and generate responses using common phrases obtained from an associated library or database.

Interactions between humans and customer service chatbots often reach a point where the chatbot is not able to process the user request or solve the issue the user is facing. In this case, a human agent may take over responsibility for handling the issue via remote troubleshooting. The agent may access the device of the user and perform one or more tasks. At times, the agent may perform the tasks in teaching mode, such that the user can fix the issue if it comes up again. In a case where an agent gets involved, the chatbot is removed from the workflow. There is a need to train chatbots to be able to perform remote troubleshooting currently performed by an agent.

SUMMARY

A first aspect of the present invention discloses a method including one or more computer processors receiving a request for help with an issue from a user via a chatbot. One or more computer processors extract information associated with the issue from the request. One or more computer processors determine a script is not available to resolve the issue. One or more computer processors request an agent to resolve the issue. One or more computer processors monitor one or more actions performed by the agent to resolve the issue. Based on the one or more actions, one or more computer processors generate a script, where the script includes a sequence of commands corresponding to the one or more actions. One or more computer processors store the script. The present invention has the advantage of automating remote troubleshooting and resolving an issue using information provided by a chat with an agent and not based on information stored in a document. The present invention also has the advantage of the ability to replay the solution script if the same or similar issue arises in the future, preventing intervention by an agent, and, therefore, leading to a reduction in operating costs for the customer service center and improved customer satisfaction.

A second aspect of the present invention discloses a computer program product including one or more computer readable storage media and program instructions collectively stored on the one or more computer readable storage media. The stored program instructions include program instructions to receive a request for help with an issue from a user via a chatbot. The stored program instructions include program instructions to extract information associated with the issue from the request. The stored program instructions include program instructions to determine a script is not available to resolve the issue. The stored program instructions include program instructions to request an agent to resolve the issue. The stored program instructions include program instructions to monitor one or more actions performed by the agent to resolve the issue. Based on the one or more actions, the stored program instructions include program instructions to generate a script, where the script includes a sequence of commands corresponding to the one or more actions. The stored program instructions include program instructions to store the script.

A third aspect of the present invention disclose a computer system including one or more computer processors and one or more computer readable storage media, where program instructions are collectively stored on the one or more computer readable storage media. The stored program instructions include program instructions to receive a request for help with an issue from a user via a chatbot. The stored program instructions include program instructions to extract information associated with the issue from the request. The stored program instructions include program instructions to determine a script is not available to resolve the issue. The stored program instructions include program instructions to request an agent to resolve the issue. The stored program instructions include program instructions to monitor one or more actions performed by the agent to resolve the issue. Based on the one or more actions, the stored program instructions include program instructions to generate a script, where the script includes a sequence of commands corresponding to the one or more actions. The stored program instructions include program instructions to store the script.

In another aspect, the present invention discloses a method including one or more computer processors opening a ticket associated with the request. One or more computer processors determine the script is available to resolve the issue. One or more computer processors retrieve the script. One or more computer processors instruct the chatbot to resolve the issue by performing one or more actions in the script. One or more computer processors store information associated with the issue and a resolution in association with the ticket. One or more computer processors close the ticket.

DETAILED DESCRIPTION

Embodiments of the present invention recognize that efficiency may be gained by logging actions of an agent during remote troubleshooting of an issue corresponding to a device or application of a user and creating one or more solution scripts such that a chatbot can learn the actions to perform from the script to troubleshoot a similar issue in the future. Embodiments of the present invention recognize that a reduction in human intervention in customer services can provide a cost reduction to a customer service center. Implementation of embodiments of the invention may take a variety of forms, and exemplary implementation details are discussed subsequently with reference to the Figures.

Figure 1:
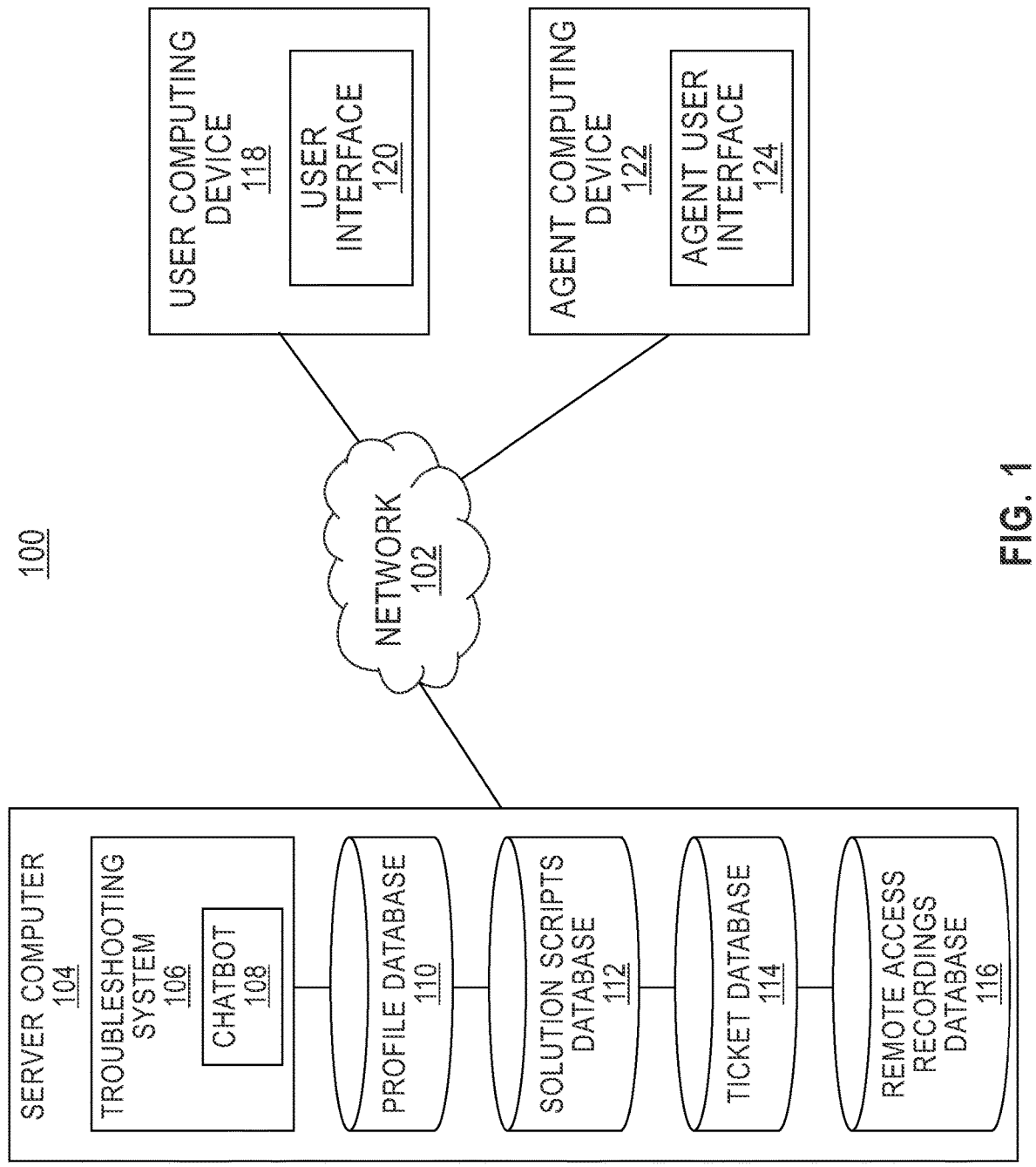
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104, user computing device 118, and agent computing device 122, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, user computing device 118, agent computing device 122 and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with user computing device 118, agent computing device 122, and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes troubleshooting system 106, profile database 110, solution scripts database 112, ticket database 114, and remote access recordings database 116. Server computer 104 may include internal and external hardware components, as depicted and described in further detail with respect to FIG. 4.

Troubleshooting system 106 generates a solution script of remote troubleshooting tasks and actions taken by a human agent to resolve a problem and stores the script such that the next time a user has a similar problem, the script is available for use by chatbot 108, and no human intervention is needed to resolve the problem. Troubleshooting system 106 receives a request for help. Troubleshooting system 106 opens a ticket and extracts issue information. If troubleshooting system 106 determines a script is not available to resolve the issue, then troubleshooting system 106 requests an agent to respond to the issue. Troubleshooting system 106 monitors and stores the actions of the agent. If troubleshooting system 106 determines the issue is resolved, then troubleshooting system 106 receives a closed ticket from the agent. Based on the stored actions of the agent, troubleshooting system 106 generates a new script for use by chatbot 108 and stores the new script. Troubleshooting system 106 includes chatbot 108. Troubleshooting system 106 is depicted and described in further detail with respect to FIG. 2 and FIG. 3.

Chatbot 108 is one of a plurality of software applications used to conduct an on-line chat communication via text or text-to-speech to help a user resolve an issue. Troubleshooting is a form of problem solving, and is a logical, systematic search for the source of a problem in order to solve the problem and make a product or process operational again. Troubleshooting system 106 includes chatbot 108.

Profile database 110, solution scripts database 112, ticket database 114, and remote access recordings database 116 are each a repository for data used by troubleshooting system 106. In the depicted embodiment, profile database 110, solution scripts database 112, ticket database 114, and remote access recordings database 116 reside on server computer 104. In another embodiment, profile database 110, solution scripts database 112, ticket database 114, and remote access recordings database 116 may each reside elsewhere within distributed data processing environment 100, provided troubleshooting system 106 has access to profile database 110, solution scripts database 112, ticket database 114, and remote access recordings database 116. In the depicted embodiment, profile database 110, solution scripts database 112, ticket database 114, and remote access recordings database 116 are each a separate database. In another embodiment, profile database 110, solution scripts database 112, ticket database 114, and remote access recordings database 116 may be combined into a single database. In a further embodiment, profile database 110, solution scripts database 112, ticket database 114, and remote access recordings database 116 may be combined into any combination of one or more databases. A database is an organized collection of data. Profile database 110, solution scripts database 112, ticket database 114, and remote access recordings database 116 can each be implemented with any type of storage device capable of storing data and configuration files that can be accessed and utilized by troubleshooting system 106, such as a database server, a hard disk drive, or a flash memory.

Profile database 110 stores information associated with the user of user computing device 118. For example, profile database 110 may include information about the user, information about user computing device 118, a description of the problem for which the user requests help, and any other information that troubleshooting system 106 needs to understand what procedure to perform to resolve the problem. Solution scripts database 112 stores a plurality of automation scripts used by chatbot 108 to resolve problems or issues experienced by a user, such as a user of user computing device 118. In an embodiment, troubleshooting system 106 uses one or more of a plurality of software products to create an automation script. In one embodiment, one or more of the scripts are in a Sikuli format. As would be recognized by a person of skill in the art, Sikuli is an open source tool for software test automation. Sikuli can automate anything displayed on a screen. Sikuli identifies the objects by using image recognition and control graphical user interface (GUI) components. Sikuli is a good option when there is no easy access to a GUI's internal or source code. Sikuli supports the creation of automation scripts of anything appearing on a screen using one or more computer vision algorithms. Ticket database 114 stores ticket identifications associated with calls for assistance received by chatbot 108 and/or a user of agent computing device 122. In addition to the ticket identifications, e.g., numbers, ticket database 114 may also store information associated with the ticket, such as a description of the problem and actions taken to provide a resolution to the problem. Remote access recordings database 116 stores recordings of actions taken by a user of agent computing device 122 to resolve a problem for a user of user computing device 118. Troubleshooting system 106 stores the actions of a remote session, which may include screenshots, video, audio, and text, in remote access recordings database 116. Remote access recordings database 116 serves as a troubleshooting database for actions that are the base for creation of an automation script.

The present invention may contain various accessible data sources, such as profile database 110, solution scripts database 112, ticket database 114, and remote access recordings database 116, that may include personal data, content, or information the user wishes not to be processed. Personal data includes personally identifying information or sensitive personal information as well as user information, such as tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. Troubleshooting system 106 enables the authorized and secure processing of personal data. Troubleshooting system 106 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Troubleshooting system 106 provides information regarding personal data and the nature (e.g., type, scope, purpose, duration, etc.) of the processing. Troubleshooting system 106 provides the user with copies of stored personal data. Troubleshooting system 106 allows the correction or completion of incorrect or incomplete personal data. Troubleshooting system 106 allows the immediate deletion of personal data.

User computing device 118 and agent computing device 122 can each be one or more of a laptop computer, a tablet computer, a smart phone, a smart watch, a smart speaker, or any programmable electronic device capable of communicating with various components and devices within distributed data processing environment 100, via network 102. User computing device 118 and agent computing device 122 may each be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment, the wearable computer may be in the form of a smart watch or a smart tattoo. In an embodiment, user computing device 118 and agent computing device 122 may each be integrated into a vehicle of the user. For example, user computing device 118 and agent computing device 122 may each include a heads-up display in the windshield of the vehicle. In general, user computing device 118 and agent computing device 122 each represents one or more programmable electronic devices or combination of programmable electronic devices capable of executing machine readable program instructions and communicating with other computing devices (not shown) within distributed data processing environment 100 via a network, such as network 102. User computing device 118 includes an instance of user interface 120. Agent computing device 122 includes an instance of agent user interface 124.

User interface 120 provides an interface between chatbot 108 on server computer 104 and a user of user computing device 118. User interface 120 also provides an interface between an agent, i.e., a user of agent computing device 122, and a user of user computing device 118. Agent user interface 124 provides an interface between server computer 104 and an agent, i.e., a user of agent computing device 122. Agent user interface 124 also provides an interface between the user of user computing device 118 and the agent. In one embodiment, user interface 120 and agent user interface 124 are each mobile application software. Mobile application software, or an "app," is a computer program designed to run on smart phones, tablet computers and other mobile devices. In one embodiment, user interface 120 and agent user interface 124 may each be a GUI or a web user interface (WUI) and can display text, documents, web browser windows, user options, application interfaces, and instructions for operation, and include the information (such as graphic, text, and sound) that a program presents to a user and the control sequences the user employs to control the program.

Figure 2:
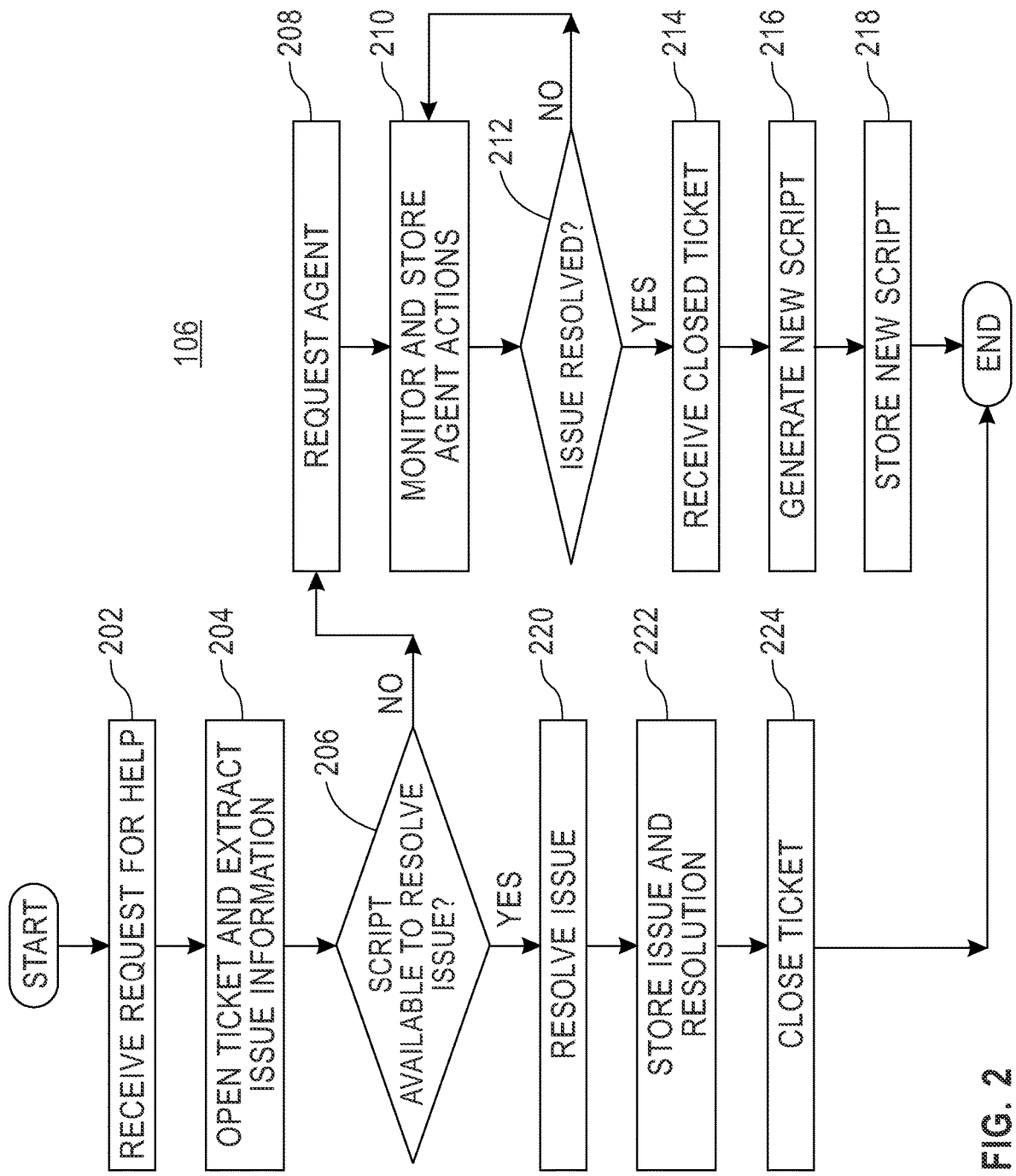
FIG. 2 is a flowchart depicting operational steps of a troubleshooting system, on a server computer within the distributed data processing environment of FIG. 1, for training a chatbot for remote troubleshooting, in accordance with an embodiment of the present invention.

FIG. 2 is a flowchart depicting operational steps of troubleshooting system 106, on server computer 104 within distributed data processing environment 100 of FIG. 1, for training chatbot 108 for remote troubleshooting, in accordance with an embodiment of the present invention.

Troubleshooting system 106 receives a request for help (step 202). In an embodiment, when a user of user computing device 118 requests assistance with an issue from chatbot 108, via user interface 120, troubleshooting system 106 receives the request. In one embodiment, troubleshooting system 106 may receive the request via a phone call to a customer service number associated with troubleshooting system 106. In another embodiment, troubleshooting system 106 may receive the request via a web page, where the user of user computing device 118 can click on a link to chatbot 108. In a further embodiment, where user interface 120 is an app associated with troubleshooting system 106, troubleshooting system 106 receives the request via the user engaging with the app. In an embodiment, the request includes detailed information about the issue with which the user needs help. For example, the user speaks information about the issue. In another example, the user may provide text to describe the issue.

Troubleshooting system 106 opens a ticket and extracts issue information (step 204). In an embodiment, troubleshooting system 106 logs the request by opening a ticket in ticket database 114. In an embodiment, troubleshooting system 106 performs a situation understanding procedure by extracting issue information from the request using one or more natural language processing (NLP) techniques. For example, troubleshooting system 106 may use a topic model, such as latent Dirichlet allocation (LDA). In an embodiment, troubleshooting system 106 also extracts an intent of the conversation with the user. In an embodiment, troubleshooting system 106 also extracts information regarding the system of the user, i.e., user computing device 118. In an embodiment, troubleshooting system 106 extracts the issue information from profile database 110. For example, troubleshooting system 106 may extract an operating system and/or environment, a device identification, user credentials, etc. In an embodiment, troubleshooting system 106 instructs chatbot 108 to request and/or confirm the system information from the user.

Troubleshooting system 106 determines whether a script is available to resolve the issue (decision block 206). In an embodiment, based on the extracted issue information, troubleshooting system 106 determines whether a script exists in solution scripts database 112 that can resolve the issue the user is experiencing. In one embodiment, troubleshooting system 106 determines whether a confidence value of a script exceeds a pre-defined threshold value in order to determine whether a script is available to resolve the issue. In an embodiment, the confidence threshold is domain dependent. For example, a confidence threshold defined for a banking system may be stricter than a confidence threshold for a remote information technology (IT) system. In an embodiment, troubleshooting system 106 uses the description of the issue, as provided by the user, as one or more keys that point to the respective solution scripts in solution scripts database 112.

If troubleshooting system 106 determines a script is not available to resolve the issue ("no" branch, decision block 206), then troubleshooting system 106 requests an agent (step 208). In an embodiment, if a solution script is not available, then troubleshooting system 106 submits a request for an agent to take over the interaction with the user from chatbot 108 to resolve the issue. In the embodiment, troubleshooting system 106 may instruct chatbot 108 to send a message to the user that indicates an agent, analyst, support technician, etc. has been contacted. For example, chatbot 108 may provide a message saying "please wait while the system locates an agent to assist you. You are currently 1 out of 1 in the queue." In an embodiment, troubleshooting system 106 sends a request for an agent to a queue associated with one or more agents, such that the agents respond to the requests in a pre-defined order. For example, the agents may respond to requests in the order the requests are received. In another example, troubleshooting system 106 may include a severity value in the request, and the agents prioritize the responses based on the severity value.

Troubleshooting system 106 monitors and stores the agent actions (step 210). In an embodiment, troubleshooting system 106 monitors the actions performed by the agent, such as user interface events performed by the agent via agent user interface 124, and records the actions in remote access recordings database 116. In an embodiment, the agent remotely accesses user computing device 118 in order to perform actions to resolve the issue. In one embodiment, the agent requests permission, via agent user interface 124, to access user computing device 118, and the user grants permission, via user interface 120. In another embodiment, the user installs a client software component on user computing device 118 (not shown) that enables remote access by the agent. In another embodiment, the agent instructs the user to perform one or more actions to resolve the issue. In an embodiment, troubleshooting system 106 captures tiles, i.e., takes small screenshots, from user interface events in the format of the recording to preserve the location of the screen where the event occurs. Since troubleshooting system 106 knows where, on a screen, a user touched or clicked, troubleshooting system 106 can also extract additional information about the touch or click, such as an XY coordinate location on the screen of the touch or mouse click, which mouse button is clicked, duration of the mouse click, etc. For example, troubleshooting system 106 can capture tiles around events such as click, touch, focus, pinch, and zoom events, performed by the agent and/or the user.

Troubleshooting system 106 determines whether the issue is resolved (decision block 212). In an embodiment, troubleshooting system 106 determines whether the issue is resolved by instructing chatbot 108 to query the user, via user interface 120, as to whether the user is satisfied with the issue resolution. In another embodiment, troubleshooting system 106 determines the issue is resolved by monitoring the conversation between the agent and the user, via one or more NLP techniques. If troubleshooting system 106 determines the issue is not resolved ("no" branch, decision block 212), then troubleshooting system 106 returns to step 210 to continue monitoring and storing the actions of the agent.

If troubleshooting system 106 determines the issue is resolved ("yes" branch, decision block 212), then troubleshooting system 106 receives a closed ticket (step 214). In an embodiment, when an agent successfully resolves an issue for a user, the agent closes the ticket in ticket database 114, and troubleshooting system 106 receives the closed ticket. The closed ticket may include information associated with the issue resolution, such as actions taken, elapsed time to resolution, identification of the agent, etc. An explicit successful status set by the agent is key for troubleshooting system 106 to set a ground truth for the resolution of a similar issue in the future. In an embodiment, troubleshooting system 106 determines the issue is resolved upon receipt of the closed ticket.

Troubleshooting system 106 generates a new script (step 216). In an embodiment, troubleshooting system 106 generates a new solution script, i.e., a set of commands, to replay the actions performed by the agent and/or the user to resolve the issue. Based on the tiles and associated information, troubleshooting system 106 generates a solution script that automates a solution for the issue. For example, the sequence of commands may be "move mouse to the network icon in the taskbar," "click network icon," "move the mouse to the disable network menu," "click disable network menu option." Troubleshooting system 106 translates the steps into a script language. An advantage of the embodiment is that if the same or similar issue arises in the future, chatbot 108 can replay the solution script and intervention by an agent is not required, leading to a reduction in operating costs for the customer service center and improved customer satisfaction. In an embodiment, troubleshooting system 106 uses one or more of a plurality of software products to create an automation script. In an embodiment, troubleshooting system 106 concatenates the actions, i.e., the user interface events and captured tiles, in the format of a Sikuli script. For example, a portion of the Sikuli script may state:

type(Key.ENTER)
    click(Location(1235,230))
    type(Key.ENTER)

An advantage of the embodiment is that it enables troubleshooting system 106 to use different modalities than typical chatbot troubleshooting, which often uses natural language processing, but does not employ automating actions via one or more computer vision algorithms.

In an embodiment, troubleshooting system 106 models a solution script as a graph, where the edges represent a transition to each problem-solving action. The edge weight represents a transition probability. For example, the graph can be depicted as a collection of circles, with each command of the set of commands inside a circle, and the circles are connected by arrows to represent the sequence of commands. Over time, troubleshooting system 106 learns common transitions from monitoring a plurality of agents resolving a plurality of issues, and updates the edge weights to represent the most common transitions between actions to solve a particular problem.

Troubleshooting system 106 stores the new script (step 218). In an embodiment, troubleshooting system 106 stores the newly generated script in solution scripts database 112. Once stored, the script is available for troubleshooting system 106 and/or chatbot 108 to use in response to a new request for assistance with an issue from a user. For example, in a cloud migration activity, there are many steps and configurations. When migration is complete, users typically contact a customer service center to ask for support with "how to" information. Troubleshooting system 106 creates a "remote assistant" that knows details of the user environment before and after migration to reduce the overall time and cost of a step-by-step, inside the environment, remote troubleshoot performed by a customer service agent. In an embodiment, troubleshooting system 106 also stores any screen recording associated with the new solution script, which can be used for future assessment of the solution script performance.

Returning to decision block 206, if troubleshooting system 106 determines a script is available to resolve the issue ("yes" branch, decision block 206), then troubleshooting system 106 resolves the issue (step 220). In an embodiment, troubleshooting system 106 retrieves a solution script corresponding to the issue information from solution scripts database 112 and performs the actions in the script. In another embodiment, troubleshooting system 106 instructs chatbot 108 to perform the actions in the retrieved script. Advantages of the embodiments include performing the actions in the retrieved script, such that troubleshooting system 106 automates remote troubleshooting and resolves the issue using information provided by a chat with an agent and not based on information stored in a document. In an embodiment, troubleshooting system 106 instructs chatbot 108 to continue interacting with the user while running the solution script. In an embodiment, chatbot 108 can ask whether to run the script faster or slower to improve the experience of the user with the support for the issue. In an embodiment where the user asks chatbot 108 to perform actions at a slower pace, troubleshooting system 106 instructs chatbot 108 to act as a tutor, teaching the user how the user can resolve the issue if the issue comes up again in the future.

Troubleshooting system 106 stores the issue and the resolution (step 222). In an embodiment, troubleshooting system 106 stores details of the issue and the resolution of the issue in ticket database 114 in association with the open ticket. As discussed with respect to step 214, the details of the issue and information associated with the issue resolution may include actions taken, elapsed time to resolution, identification of the agent, identification of the solution script used, details of the solution script, etc.

Troubleshooting system 106 closes the ticket (step 224). In an embodiment, in response to successfully resolving the issue for the user, troubleshooting system 106 closes the ticket in ticket database 114. In another embodiment, troubleshooting system 106 instructs chatbot 108 to close the ticket.

Figure 3:
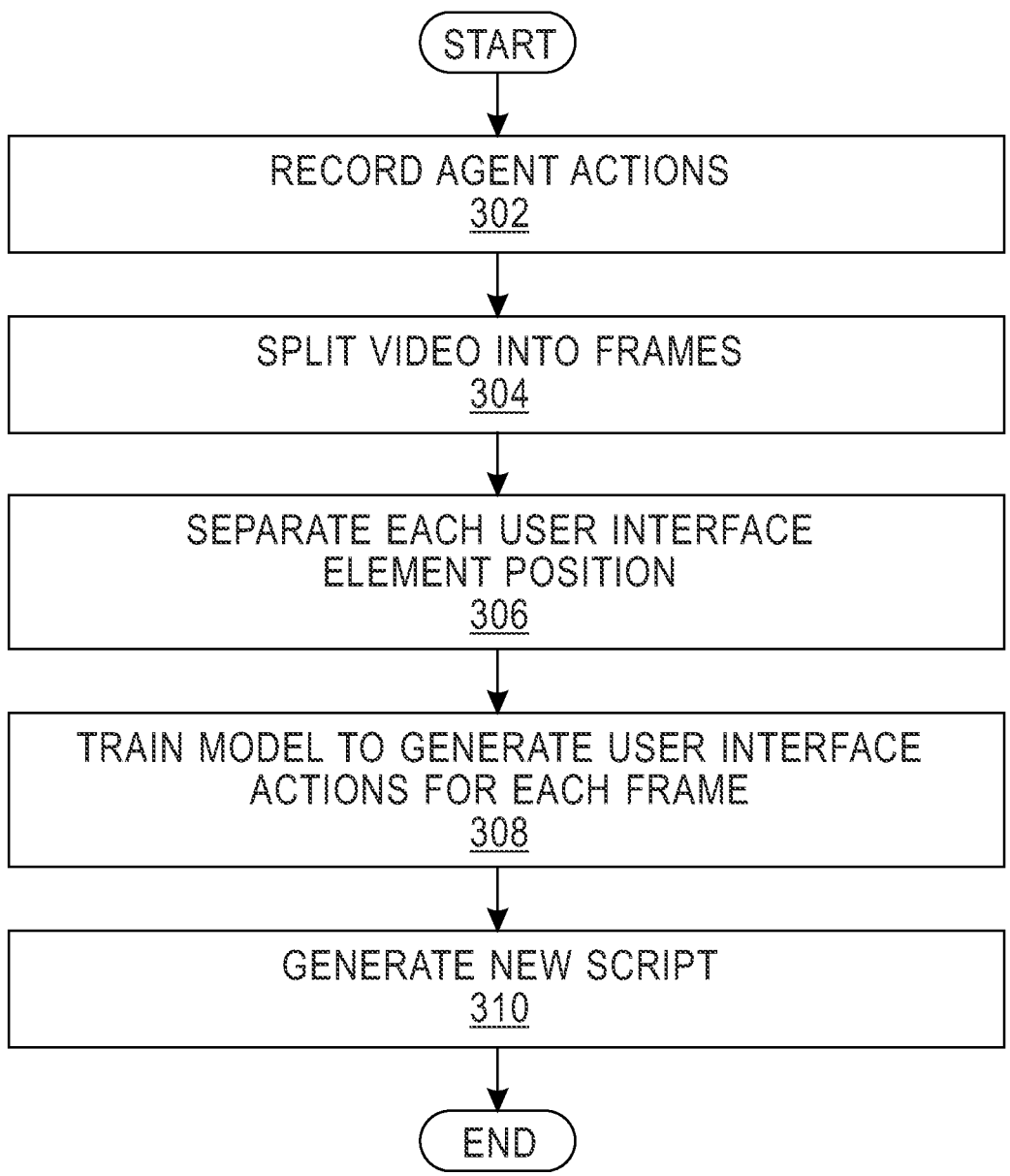
FIG. 3 is a flowchart depicting alternate operational steps of the troubleshooting system, on the server computer within the distributed data processing environment of FIG. 1, in accordance with an embodiment of the present invention.

FIG. 3 is a flowchart depicting alternate operational steps of troubleshooting system 106, on server computer 104 within distributed data processing environment 100 of FIG. 1, in accordance with an embodiment of the present invention. In an embodiment where there are no recorded actions stored in remote access recordings database 116, i.e., a cold start, troubleshooting system 106 performs a bootstrap procedure, as outlined in FIG. 3.

Troubleshooting system 106 records agent actions (step 302). In an embodiment, troubleshooting system 106 records video of actions performed by an agent and/or the user in a troubleshooting process.

Troubleshooting system 106 splits video into frames (step 304). In an embodiment, troubleshooting system 106 splits the video into frames to enable frame by frame analysis.

Troubleshooting system 106 separates each user interface element position (step 306). In an embodiment, troubleshooting system 106 performs frame by frame analysis using one or more computer vision algorithms, as would be recognized by a person of skill in the art. The frame by frame analysis classifies actions performed by the agent and/or the user. For example, actions may be classified as mouse movement, clicks, typing, etc. The frame by frame analysis also enables troubleshooting system 106 to extract tiles related to user interface elements with which the agent and/or the user interacted.

Troubleshooting system 106 trains a model to generate user interface actions for each frame (step 308). In an embodiment, based on the frame by frame analysis, troubleshooting system 106 inputs an image frame to a model, and the model outputs a script action text. Training the model is a creation of a set of internal rules that analyze an image, understand the user interface elements, and generate a corresponding command.

Troubleshooting system 106 generates a new script (step 310). In an embodiment, troubleshooting system 106 runs the model trained in step 308 and generates a new solution script from the output of the model. In an embodiment where a similar solution script exists, troubleshooting system 106 updates the similar script.

Figure 4:
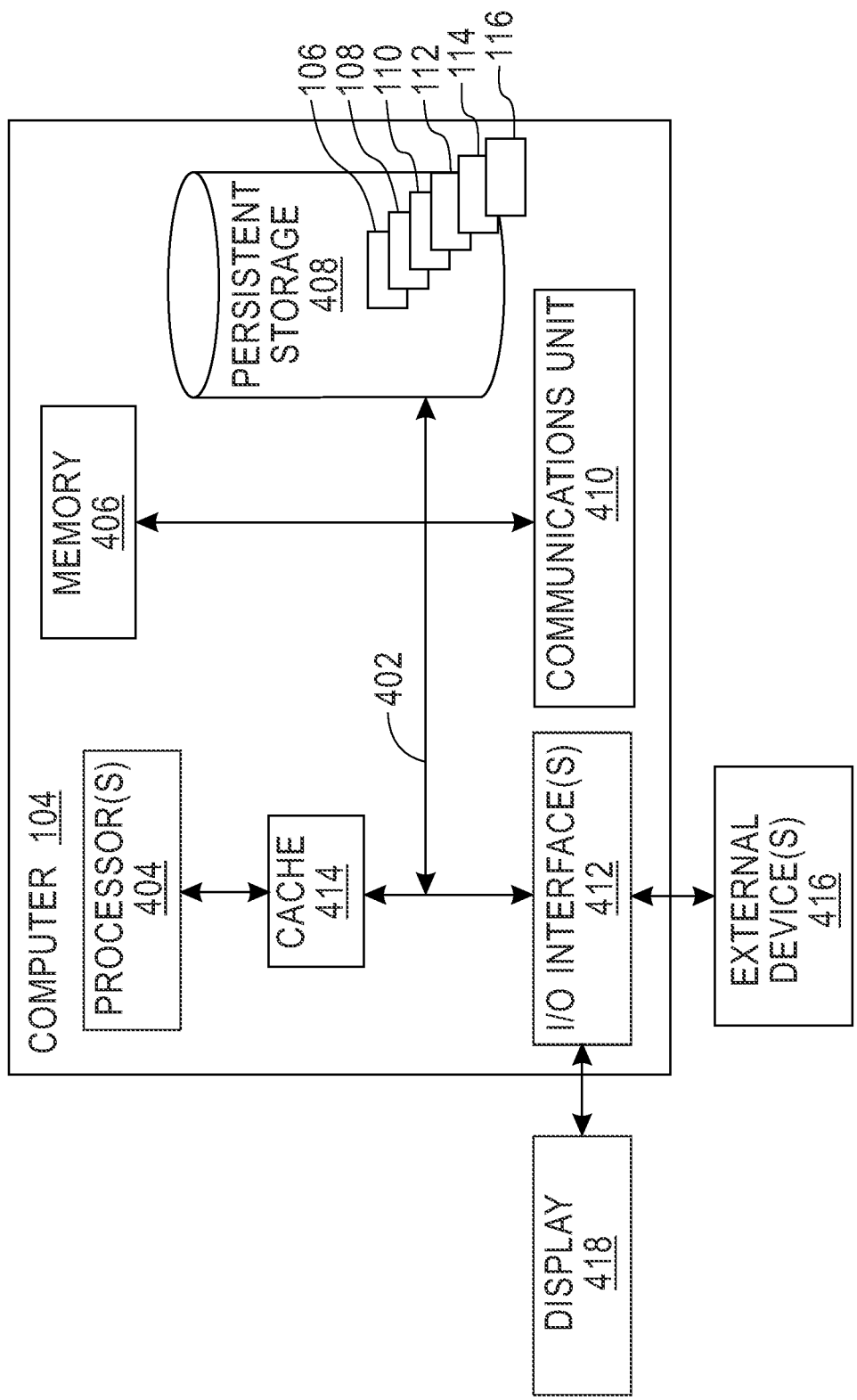
FIG. 4 depicts a block diagram of components of the server computer executing the troubleshooting system within the distributed data processing environment of FIG. 1, in accordance with an embodiment of the present invention.

FIG. 4 depicts a block diagram of components of server computer 104 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 104 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., chatbot 108, troubleshooting system 106, profile database 110, solution scripts database 112, ticket database 114, and remote access recordings database 116, are stored in persistent storage 408 for execution and/or access by one or more of the respective processor(s) 404 of server computer 104 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of user computing device 118 and agent computing device 122. In these examples, communications unit 410 includes one or more network interface cards. Communications unit 410 may provide communications through the use of either or both physical and wireless communications links. Chatbot 108, troubleshooting system 106, profile database 110, solution scripts database 112, ticket database 114, remote access recordings database 116, and other programs and data used for implementation of the present invention, may be downloaded to persistent storage 408 of server computer 104 through communications unit 410.

I/O interface(s) 412 allows for input and output of data with other devices that may be connected to server computer 104. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., chatbot 108, troubleshooting system 106, profile database 110, solution scripts database 112, ticket database 114, and remote access recordings database 116 on server computer 104, can be stored on such portable computer readable storage media and can be loaded onto persistent storage 408 via I/O interface(s) 412. I/O interface(s) 412 also connect to display 418.

Display 418 provides a mechanism to display data to a user and may be, for example, a computer monitor. Display 418 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing descriptions of the various embodiments of the present invention have been presented for purposes of illustration and example, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   receiving, by one or more computer processors, a request for help with an issue from a user via a chatbot;
   extracting, by one or more computer processors, information associated with the issue from the request;
   determining, by one or more computer processors, a corresponding automation script is not available to resolve the issue;
   requesting, by one or more computer processors, an agent to resolve the issue;
   monitoring, by one or more computer processors, one or more actions performed by the agent to resolve the issue;
   translating, by one or more computer processors, the one or more actions performed by the agent into an automation script language;
   based on the translation of the one or more actions, generating, by one or more computer processors, an automation script, wherein the automation script includes a sequence of commands corresponding to the one or more actions; and
   storing, by one or more computer processors, the automation script.

2. The computer-implemented method of claim 1, wherein monitoring the one or more actions performed by the agent further comprises:
   storing, by one or more computer processors, the one or more actions performed by the agent;
   capturing, by one or more computer processors, one or more tiles associated with the one or more actions, wherein the tiles include a location of the one or more actions on a screen; and
   extracting, by one or more computer processors, additional information about the one or more actions, wherein the additional information includes an XY coordinate location on the screen of a touch, a second XY coordinate location on the screen of a mouse click, a determination of which mouse button is clicked, and a duration of the mouse click.

3. The computer-implemented method of claim 1, further comprising:
   opening, by one or more computer processors, a ticket associated with the request;
   determining, by one or more computer processors, the automation script is available to resolve the issue;
   retrieving, by one or more computer processors, the automation script;
   instructing, by one or more computer processors, the chatbot to resolve the issue by performing one or more actions in the automation script;
   storing, by one or more computer processors, information associated with the issue and a resolution in association with the ticket; and
   closing, by one or more computer processors, the ticket.

4. The computer-implemented method of claim 1, wherein the one or more actions performed by the agent include remotely accessing a device of the user to perform the one or more actions.

5. The computer-implemented method of claim 1, wherein the automation script is in a Sikuli format.

6. The computer-implemented method of claim 1, further comprising:
monitoring, by one or more computer processors, a conversation between the agent and the user via one or more natural language processing techniques; and
determining, by one or more computer processors, based on the conversation, the issue is resolved.

7. The computer-implemented method of claim 1, wherein the information associated with the issue includes at least one of: an intent of a conversation between the chatbot and the user, information regarding an operating system of a device of the user, information regarding an environment of the device of the user, an identification of the device of the user, and one or more credentials of the user.

8. A computer program product comprising:
one or more computer readable storage media and program instructions collectively stored on the one or more computer readable storage media, the stored program instructions comprising:
program instructions to receive a request for help with an issue from a user via a chatbot;
program instructions to extract information associated with the issue from the request;
program instructions to determine a corresponding automation script is not available to resolve the issue;
program instructions to request an agent to resolve the issue;
program instructions to monitor one or more actions performed by the agent to resolve the issue;
program instructions to translate the one or more actions performed by the agent into an automation script language;
based on the translation of the one or more actions, program instructions to generate an automation script, wherein the automation script includes a sequence of commands corresponding to the one or more actions; and
program instructions to store the automation script.

9. The computer program product of claim 8, wherein the program instructions to monitor the one or more actions performed by the agent comprise:
program instructions to store the one or more actions performed by the agent;
program instructions to capture one or more tiles associated with the one or more actions, wherein the tiles include a location of the one or more actions on a screen; and
program instructions to extract additional information about the one or more actions, wherein the additional information includes an XY coordinate location on the screen of a touch, a second XY coordinate location on the screen of a mouse click, a determination of which mouse button is clicked, and a duration of the mouse click.

10. The computer program product of claim 8, the stored program instructions further comprising:
program instructions to open a ticket associated with the request;
program instructions to determine the automation script is available to resolve the issue;
program instructions to retrieve the automation script;
program instructions to instruct the chatbot to resolve the issue by performing one or more actions in the automation script;
program instructions to store information associated with the issue and a resolution in association with the ticket; and
program instructions to close the ticket.

11. The computer program product of claim 8, wherein the one or more actions performed by the agent include remotely accessing a device of the user to perform the one or more actions.

12. The computer program product of claim 8, wherein the automation script is in a Sikuli format.

13. The computer program product of claim 8, the stored program instructions further comprising:
program instructions to monitor a conversation between the agent and the user via one or more natural language processing techniques; and
program instructions to determine, based on the conversation, the issue is resolved.

14. The computer program product of claim 8, wherein the information associated with the issue includes at least one of: an intent of a conversation between the chatbot and the user, information regarding an operating system of a device of the user, information regarding an environment of the device of the user, an identification of the device of the user, and one or more credentials of the user.

15. A computer system comprising:
one or more computer processors;
one or more computer readable storage media;
program instructions collectively stored on the one or more computer readable storage media for execution by at least one of the one or more computer processors, the stored program instructions comprising:
program instructions to receive a request for help with an issue from a user via a chatbot;
program instructions to extract information associated with the issue from the request;
program instructions to determine a corresponding automation script is not available to resolve the issue;
program instructions to request an agent to resolve the issue;
program instructions to monitor one or more actions performed by the agent to resolve the issue;
program instructions to translate the one or more actions performed by the agent into an automation script language;
based on the translation of the one or more actions, program instructions to generate an automation script, wherein the automation script includes a sequence of commands corresponding to the one or more actions; and
program instructions to store the automation script.

16. The computer system of claim 15, wherein the program instructions to monitor the one or more actions performed by the agent comprise:
program instructions to store the one or more actions performed by the agent;
program instructions to capture one or more tiles associated with the one or more actions, wherein the tiles include a location of the one or more actions on a screen; and
program instructions to extract additional information about the one or more actions, wherein the additional information includes an XY coordinate location on the screen of a touch, a second XY coordinate location on the screen of a mouse click, a determination of which mouse button is clicked, and a duration of the mouse click.

17. The computer system of claim 15, the stored program instructions further comprising:

program instructions to open a ticket associated with the request;

program instructions to determine the automation script is available to resolve the issue;

program instructions to retrieve the automation script;

program instructions to instruct the chatbot to resolve the issue by performing one or more actions in the automation script;

program instructions to store information associated with the issue and a resolution in association with the ticket; and program instructions to close the ticket.

18. The computer system of claim 15, wherein the one or more actions performed by the agent include remotely accessing a device of the user to perform the one or more actions.

19. The computer system of claim 15, the stored program instructions further comprising:

program instructions to monitor a conversation between the agent and the user via one or more natural language processing techniques; and program instructions to determine, based on the conversation, the issue is resolved.

20. The computer system of claim 15, wherein the information associated with the issue includes at least one of: an intent of a conversation between the chatbot and the user, information regarding an operating system of a device of the user, information regarding an environment of the device of the user, an identification of the device of the user, and one or more credentials of the user.

* * * * *